United States Patent
Gronbach et al.

(10) Patent No.: US 7,324,760 B2
(45) Date of Patent: Jan. 29, 2008

(54) APPARATUS AND METHOD FOR PHASE SYNCHRONIZATION CONTROL IN RZ OPTICAL TRANSMITTER

(75) Inventors: Siegfried Gronbach, Bubenreuth (DE); Stefan Weisser, Nuremberg (DE)

(73) Assignee: Lucent Technologies Inc., Murray Hill, NJ (US)

( * ) Notice: Subject to any disclaimer, the term of this patent is extended or adjusted under 35 U.S.C. 154(b) by 694 days.

(21) Appl. No.: 10/789,586

(22) Filed: Feb. 27, 2004

(65) Prior Publication Data

US 2005/0191060 A1  Sep. 1, 2005

(51) Int. Cl.
*H04B 10/04* (2006.01)

(52) U.S. Cl. ............... 398/183; 398/182; 398/185; 398/186; 398/187; 398/188; 398/189; 398/190; 398/191; 398/192; 398/193; 398/194; 398/195; 398/198; 398/196; 398/197; 398/202; 398/208; 398/209; 398/206; 359/245; 359/246; 359/240

(58) Field of Classification Search ............... 398/182, 398/183, 185, 186, 187, 188, 189, 190, 191, 398/192, 193, 209, 194, 206, 195, 208, 198, 398/202, 196, 197; 359/245, 246, 240

See application file for complete search history.

(56) References Cited

U.S. PATENT DOCUMENTS 6,952,534 B1 * 10/2005 Sikora .................. 398/183
7,184,671 B2 * 2/2007 Wang .................. 398/195
2002/0080817 A1  6/2002 Giingener et al.
2002/0114047 A1  8/2002 McBrien et al. ........... 359/180
2003/0112487 A1  6/2003 Fuller et al. ............... 359/239
2003/0175037 A1  9/2003 Kimmitt et al. ........... 398/198

FOREIGN PATENT DOCUMENTS

DE  102 40 465 A1  3/2004
EP  0 975 104 A1  1/2000

OTHER PUBLICATIONS

Muhammad Taher Abuela'atti, Large Signal Analysis of Dual Parallel Mach-Zehnder Modulator, Proc. Natl. Sci. Counc. ROC(A), vol. 22, No. 6, 1998, pp. 800-804.
Muhammad Taher Abuela'atti, Large Signal Analysis of the Mach-Zehnder Modulator with Variable BIAS, Proc. Natl. Sci. Counc. ROC(A), vol. 25, No. 4, 2001, pp. 254-258.

* cited by examiner

*Primary Examiner*—Hanh Phan

(57) ABSTRACT

An optical RZ transmitter comprises an optical signal source and a pair of electro-optical modulators in tandem, one arranged to receive a NRZ electrical data signal and the other a clock signal at the data rate of the data signal. The phase difference between the data signal and the clock signal is controlled by adding a first dither signal to a bias signal applied to the modulator receiving the data signal, and a second dither signal, having a different frequency, to the phase difference. The amplitude of variations in the power of the optical output signal corresponding to cross-modulation of the first and second dither signals is detected and the phase difference is controlled in response to the detected amplitude.

11 Claims, 5 Drawing Sheets

(a)

(b)

(c)

(a)

(b)

(c)

PHASE → BIAS

APPARATUS AND METHOD FOR PHASE SYNCHRONIZATION CONTROL IN RZ OPTICAL TRANSMITTER

TECHNICAL FIELD

This invention relates to return-to-zero (RZ) optical transmitters, and in particular for methods and apparatus for achieving phase synchronization between a non-return-to-zero (NRZ) data signal and the RZ optical pulses.

BACKGROUND OF THE INVENTION

In a known type of optical pulse transmitter, a continuous-wave optical source is used to provide a continuous optical signal which is modulated in an electro-optical modulator by a NRZ electrical data signal to provide a NRZ modulated optical signal, and this NRZ optical signal is then converted to RZ form in a pulse transformer (essentially a second modulator) which is clocked at the same data rate as the data signal. Typically, the modulator used for the NRZ signal and the pulse transformer each take the form of a Mach-Zehnder modulator.

For such a pulse transmitter to work efficiently, it needs to be ensured that the bias applied to the two modulators is correct, so that they are both operated in the optimum portion of their operating characteristics, and the relative phase between the NRZ data signal and the RZ signal applied to the pulse transformer needs to be correct, so that the RZ pulses correspond to the widest-open part of the eye of the NRZ signal.

The problem of maintaining correct bias on the modulators is well understood and is satisfactorily solved by adding dither tone signals to various parts of the transmitter. A small part of the optical output signal of the transmitter is coupled out by an optical splitter and is detected by means of a photodetector which is slow enough not to respond to the pulse frequency, which is typically of the order of tens of GHz, 43 GHz being typical, but able to respond to the frequency of the dither tone signals, which is typically of the order of a few KHz, 2 KHz being typical. The electrical output signal from the photodetector is then demodulated to detect the amplitude at the frequency of the dither tone. The detected amplitude forms a control signal for a control loop.

Typically, the control loops for the two biases are not operated simultaneously, but in a time-multiplexed manner. That is to say, the dither tone is applied in turn to respective parts of the transmitter, and the detected amplitude used to control the two biases in turn. This makes it possible to have only one tone generator, one hardware filter at the tone frequency and the same demodulation processing for the two control loops. This technique is well known, works well and is commonly employed.

However, while this technique works well for controlling the bias, it does not lend itself to controlling the phase, for a number of reasons which will be explained below.

SUMMARY OF THE INVENTION

According to an aspect of the invention, phase synchronization control between a pulse forming clock and a data signal of a RZ optical transmitter is provided.

According to the present invention, a first dither signal is applied to the phase difference and a second dither signal, having a different frequency than the first dither signal, is simultaneously applied to the bias level of the NRZ modulator, and variations in the optical output power corresponding to cross-modulation of the two dither frequencies are detected.

In an embodiment of the invention, the second dither signal is at a substantially lower frequency than the first dither signal, for example, the first dither signal may be 2 KHz and the second dither signal may be 2 Hz. Then, the amplitude of variations in the optical output power at the higher frequency (2 KHz) is detected, and the amplitude of variations in that amplitude at the lower frequency (2 Hz) is measured and used to form the control signal. This has the advantage that the same tone generator, hardware filter and demodulation processing can be used as with the conventional control loops that control the biases.

DETAILED DESCRIPTION

Figure 1:
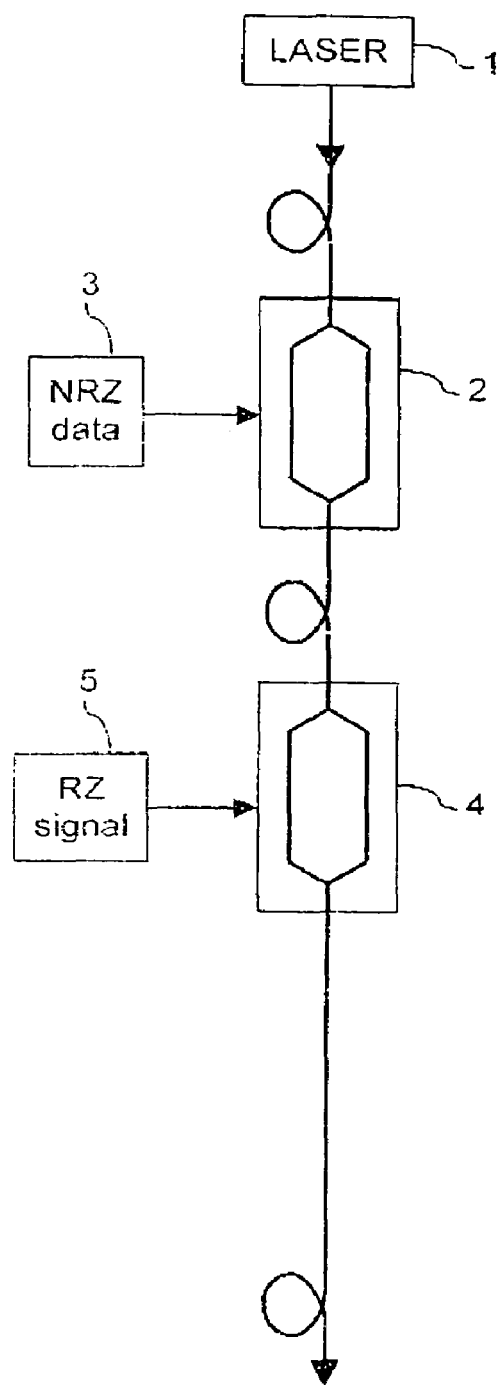
FIG. 1 shows a known optical transmitter of the type to which the invention can be applied.
Figure 1:
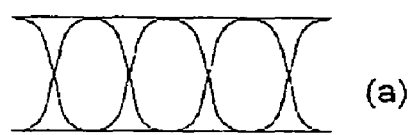
Figure 1:
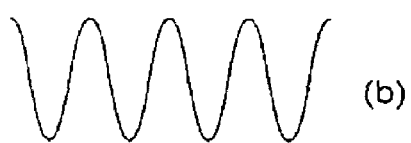
Figure 1:

FIG. 1 shows a known optical transmitter of the type to which the invention can be applied.

A continuous-wave laser 1 provides a continuous optical signal to a first Mach-Zehnder modulator 2, which receives as modulation input a NRZ data signal from a NRZ data source 3. The optical output of the first Mach-Zehnder modulator 2 is an optical NRZ signal whose eye diagram is shown at (a). The optical NRZ signal is connected as input to a second Mach-Zehnder modulator 4 which receives as modulation input a periodic pulse signal from a pulse signal source 5. The pulse signal, which is shown at (b), has a pulse rate equal to the data rate of the NRZ data signal, typically of the order of tens of GHz, e.g. 43 GHz. The second Mach-Zehnder modulator thus acts as a pulse transformer, gating the NRZ optical signal to produce a RZ optical signal whose eye diagram is shown at (c).

Such transmitters conventionally include control circuitry for accurately maintaining the wavelength of the laser 1 and for controlling the biases applied to the Mach-Zehnder modulators 2 and 4 to be at their optimum levels. Such control circuitry is well-known and is not shown in FIG. 1.

The advantages of RZ optical signals over NRZ optical fiber signals when they are transmitted over optical fibers are well known.

For the RZ optical signal to have a good open eye diagram, as shown at (c), it is necessary that the peaks of the pulse signal are closely synchronized with the most open part of the eye of the NRZ optical signal, or, in other words, it is necessary that the relative phase between the pulse signal and the data signal be accurately controlled. It is an object of the present invention to provide such control.

Figure 2:
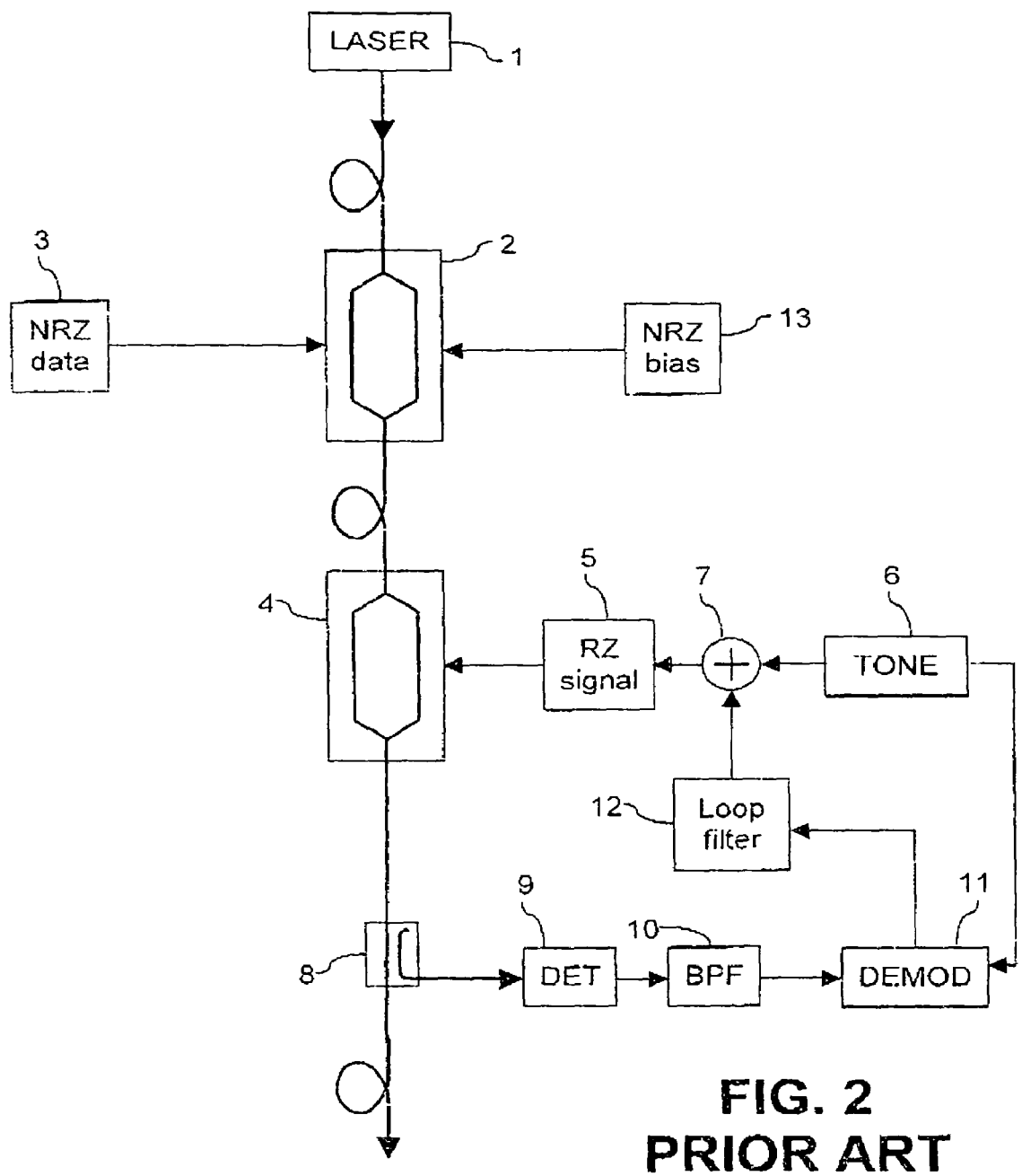
FIG. 2 shows an optical transmitter as shown in FIG. 1, including control circuitry for controlling the relative phase between to pulse signal and the data signal according to a known technique.

FIG. 2 shows an optical transmitter as shown in FIG. 1, including control circuitry for controlling the relative phase between to pulse signal and the data signal according to a known technique.

The pulse signal source 5 is connected to receive a phase control signal which includes a pilot tone from a tone generator 6, via an adder circuit 7. The tone generator 6 provides a jitter to the phase control signal at a frequency which is low compared with the data rate of the transmitter, for example 2 kHz. This jitter, applied to the phase of the pulse signal source 5, gives rise to a component of the optical output power of the transmitter having the same frequency (2 kHz in the example) when the relative phase between the data signal and the pulse signal is away from its optimum value. The transmitter of FIG. 2 includes a feedback loop which derives an error signal from the detected component in the optical output signal. An optical coupler 8 is arranged to extract a small fraction of the optical output signal and this is detected by a slow photodetector 9, typically a photodiode. The photodetector 9 is sufficiently slow that it does not respond to frequencies comparable to the data rate of the transmitter (43 GHz in the example) but does respond to the much lower frequency of the tone signal (2 kHz in the example). The electrical output of the photodetector 9 is therefore a measure of the mean optical output power of the transmitter and includes a component corresponding to the tone signal. The output of the photodector 9 is passed through a band-pass filter 10 which has a pass band centered on the frequency of the tone signal, the main purpose of which is to amplify the desired component relative to the background and other components. The output of the filter 10 is connected as input to a demodulator 11, which also receives the tone signal from the tone generator 6, and coherently demodulates the signal from the filter 10 to provide an output which is proportional to the amplitude of the frequency component of the optical output power corresponding to the tone signal and which has a sign corresponding to the direction of the phase deviation. The output of the demodulator is connected to a loop filter 12 which conditions the signal in a manner well known in the art of feedback loops. The output of the loop filter is connected to the adder circuit 7 where it is added to the tone signal to provide a phase control bias signal for the pulse signal source 5.

Since the known control loops for controlling the bias levels applied to the Mach-Zehnder modulators 2 and 4 employ many of the same hardware components as the control loop for controlling the phase, they can be used for all three control loops on a time-sharing basis, in a well-known fashion.

The theory behind the control loop for controlling the phase is that the mean optical output power of the transmitter depends on the relative phase of the pulse signal and the data signal, having a stationary value at the optimum value of the phase.

Unfortunately, under ideal operating conditions, this is not true. FIG. 3(a) shows the eye diagram of the NRZ optical signal when the bias of the first Mach-Zehnder modulator 2 is optimal and the rise and fall times of the data signal are equal. The mean power level, shown as a dotted line 30, is constant. Since the mean power level is constant, not varying from one part of the data period to another, it will clearly make no difference to the mean output power whether the second Mach-Zehnder modulator 4 samples the signal at the center of the eye 31, which is the optimum position, or at the cross-over point 32, which is the worst position, or anywhere in between.

A known solution to this problem is to add a small amount to the bias applied to the first Mach-Zehnder modulator by the bias control circuitry 13 of FIG. 2. FIG. 3(b) shows the eye diagram of the NRZ optical signal when the bias applied to the first Mach-Zehnder modulator 2 is increased beyond its optimum value. The top of the eye 41 is flattened, since the center of the signal is pushed closer towards the upper saturation region of the modulator and the bottom of the eye 42 is sharpened, since the center of the signal is moved away from the lower saturation region. In fact, because the Mach-Zehnder modulator, as is well known, has a sinusoidal characteristic, the top of the eye may not only be flattened but have a slight minimum as shown in the drawing, but if other forms of optical modulator are used, the top of the eye will at least be flattened and the bottom sharpened. The mean power level, shown as a dotted line 40, thus has a minimum at the center of the eye. Thus, the mean power level of the NRZ optical signal, when gated by the pulse signal, i.e. the mean power of the RZ optical signal, as a function of the relative phase between the data signal and the pulse signal, will have a minimum when the pulses coincide with the center of the eye of the NRZ signal. Thus, the feedback loop will work when set to find the minimum of the mean power level.

FIG. 3(c) shows the eye diagram of the NRZ optical signal when the bias applied to the first Mach-Zehnder modulator 2 is reduced below its optimum value. In this case the bottom of the eye is flattened and the top sharpened, so the mean power level 50 has a maximum corresponding to the optimum relative phase and the feedback loop will work when set to find the maximum of the mean power level.

Figure 3:
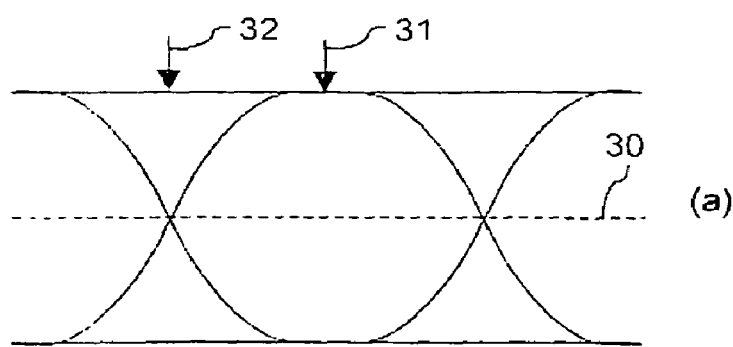
FIG. 3 shows eye diagrams of an optical NRZ signal under ideal operating conditions and with the bias level set away from the optimum position.
Figure 3:
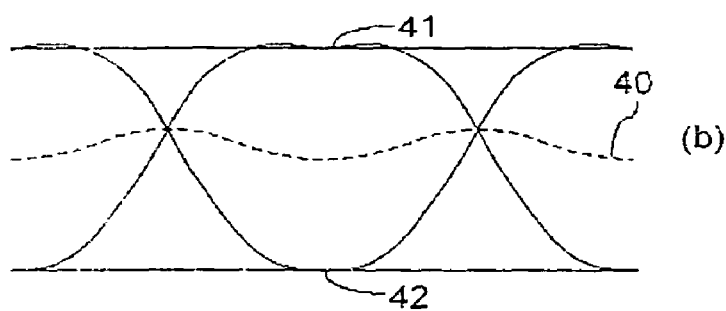
Figure 4:
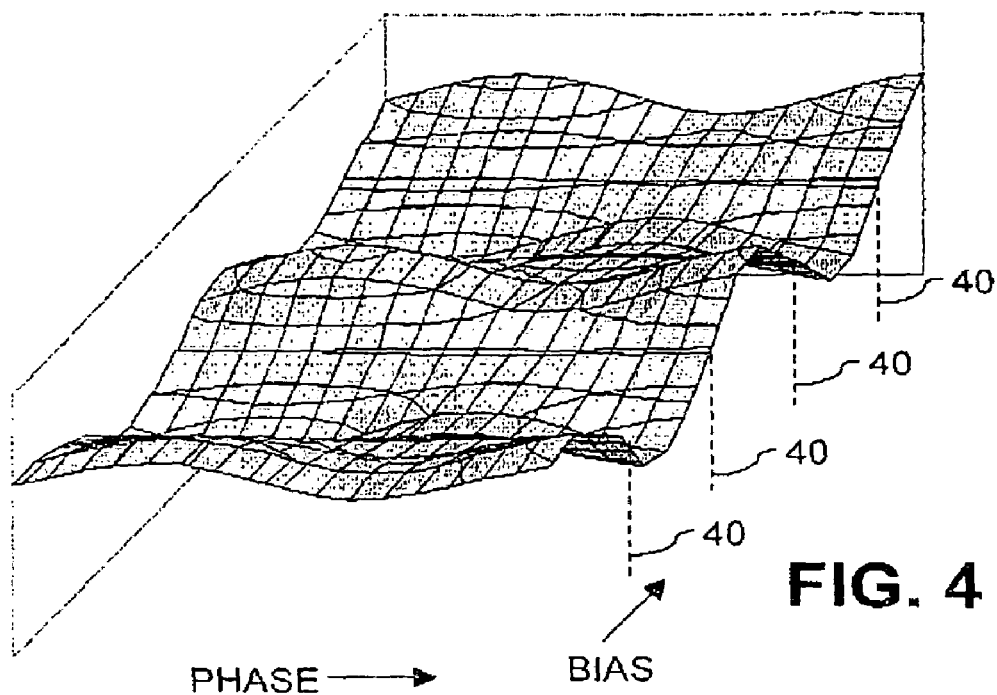
FIG. 4 shows the mean optical output power as a function of bias and phase.

FIG. 4 is a plot of some measurements showing the variation of the mean power level with bias and phase. At the optimum bias values 40 the power is substantially independent of the phase, but at other values of bias the power has maxima and minima as a function of phase, as shown in FIG. 3.

Figure 5:
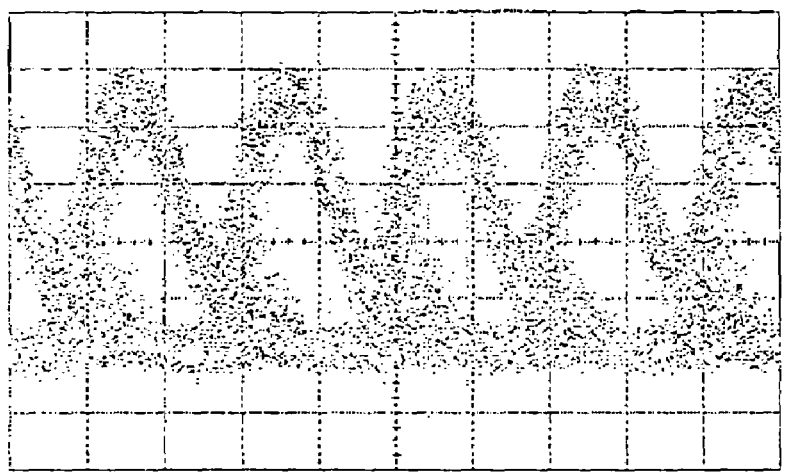
FIG. 5 shows an oscilloscope trace of optical eye diagrams obtained with a deviated phase operating point.

This solution has a number of disadvantages. Firstly, it involves operating the first Mach-Zehnder modulator 2 systematically at a non-optimal bias level. Even more importantly, however, it only works correctly if the rise and fall times of the data signals are equal, so that the eye diagrams are symmetrical. If the rise and fall times are unequal, as is often the case in practice, the eye diagrams are no longer symmetrical, and the positions of the maxima and minima of the mean power level when a non-optimal bias is applied are shifted. Thus, a control loop that found the maxima and minima would result in a non-optimal phase. There is no way to get to the optimum phase. the more different the rise and fall times are, the higher is the deviation and thereby the resulting phase error. FIG. 5 shows an oscilloscope trace of the optical eyes resulting from a deviated phase operating point due to non-symmetric eye diagrams.

For these reasons the known solution described above is considered to be unsatisfactory and is often not used at all. Instead, the phase is accurately fixed during manufacture. However, this requires difficult adjustment to be carried out in the factory, and has the further disadvantage that the system is susceptible to changing environmental conditions.

Figure 6:
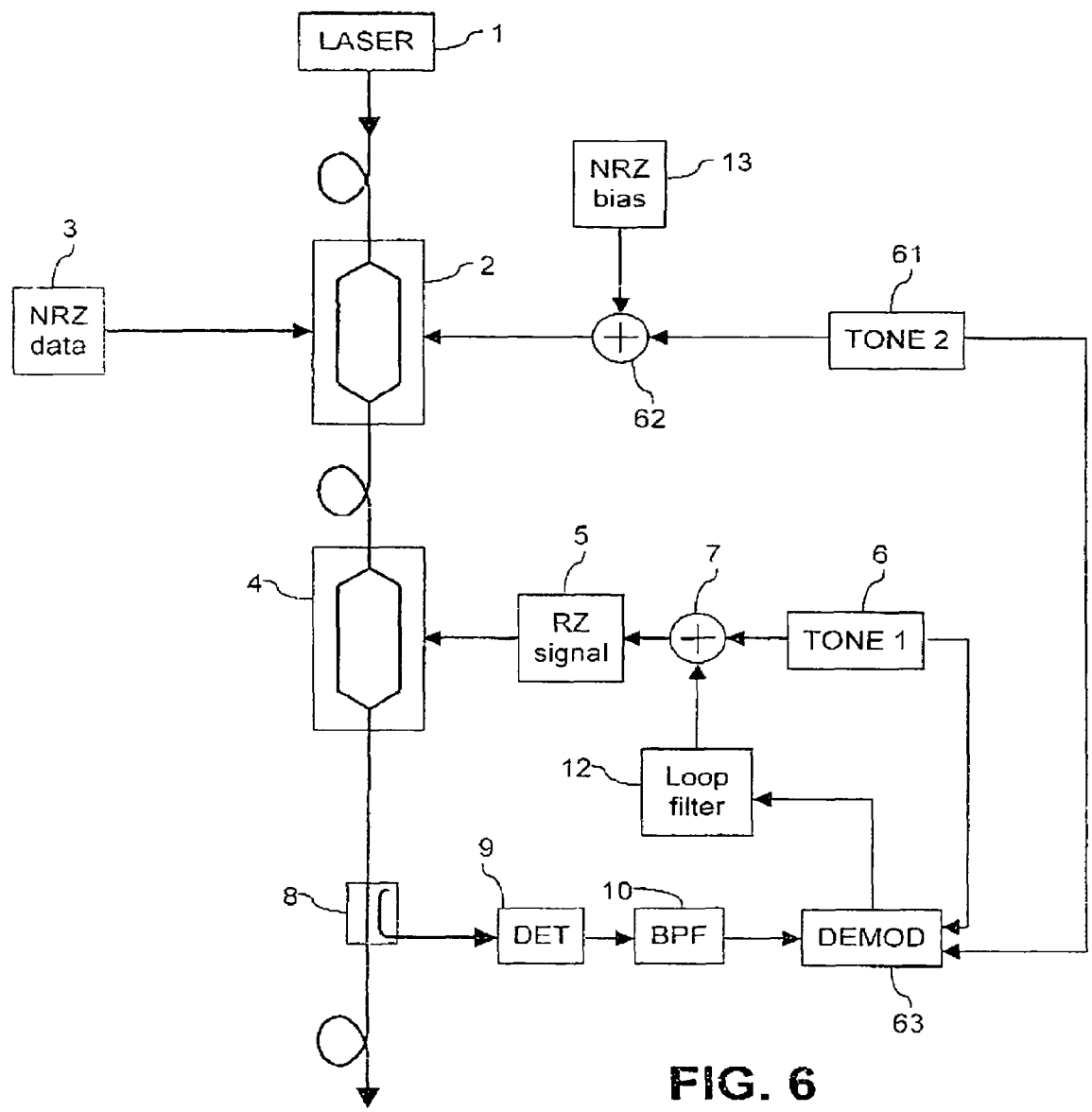
FIG. 6 shows an example of a transmitter embodying the present invention.

FIG. 6 shows a transmitter according to the invention. In addition to the tone generator 6 used by the transmitter of FIG. 2, there is a second tone generator, producing a second tone having a different frequency than the first tone produced by the first tone generator 6. The second tone, produced by the second tone generator 61, is added, by an adder 62, to the bias applied to the first Mach-Zehnder modulator 2 by the bias control circuitry 13. The bias control circuitry 13 is set to adjust the bias to the optimum operating point, so the effect is that the first Mach-Zehnder modulator operates at its optimum bias point, with a small jitter at the frequency of the second tone. The second tone generator also supplies the second tone to a two-dimensional demodulator 63 which replaces the demodulator 11 of FIG. 2 in the phase control circuit, which is otherwise similar to the phase control circuit of FIG. 2, and the same references 5-10 and 12 have been used to denote corresponding components.

The two-dimensional demodulator 63 detects the component in the detected mean optical output power which corresponds to cross modulation of the first and second tones. The amplitude of the component having the frequency of the first tone depends, not only on the phase, but also on the value of the bias. The value of the bias has an oscillatory component due to the second tone. Therefore, the amplitude of the component of the mean optical output power having the frequency of the first tone will itself have an oscillatory component having the frequency of the second tone. If the frequencies of the first and second tones were comparable, it would be possible to detect a frequency component in the mean optical output power having a frequency corresponding to the sum or difference of the frequencies of the first and second tones, but in our currently preferred technique, the frequency of the second tone is substantially lower than that of the first tone, for example 2 Hz as opposed to 2 KHz for the first tone. This means that the same band pass filter 10 can be used without modification, since the bandwidth of the modulated signal is small. It also means that the two-dimensional demodulator 63 may be as shown in FIG. 7.

Figure 7:
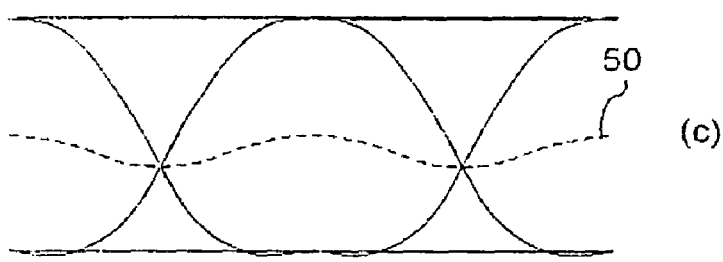
FIG. 7 shows a demodulator forming part of the transmitter of FIG. 6.
Figure 7:
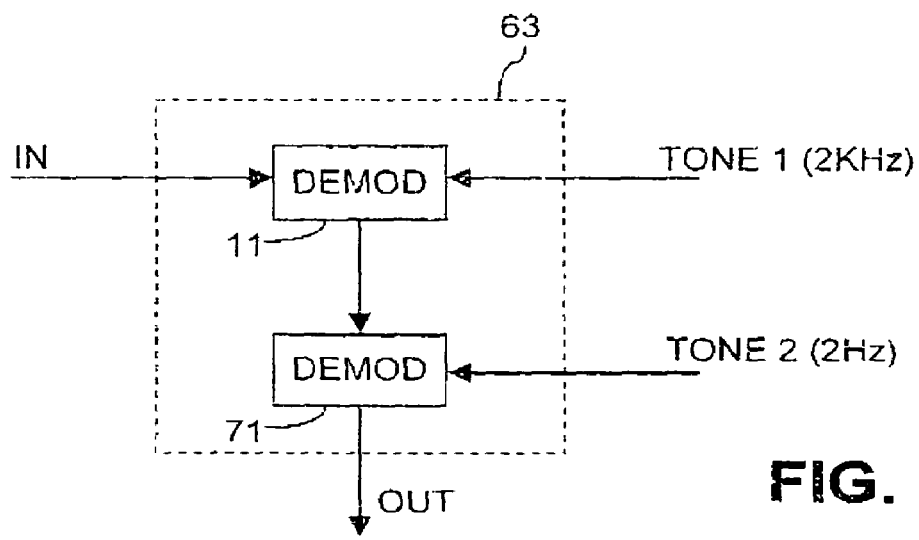

The demodulator 63 shown in FIG. 7 comprises a first demodulator 11, similar to that of FIG. 2, connected to receive the input signal and the first tone and a second demodulator 71, connected to received the output from the first demodulator 11 and the second tone and arranged to provide as output the amplitude of the component in the output signal of the first demodulator 11 having the frequency of the second tone.

With such an arrangement the output of the two dimensional demodulator represents the deviation from the optimal phase even in the case of non-ideal optical eyes with different rise and fall times. Its amplitude corresponds to the distance and its sign corresponds to the direction of the phase deviation. Thereby the problems described above can be overcome.

The present invention may be embodied in other specific forms without departing from its spirit or essential characteristics. The described embodiments are to be considered in all respects only as illustrative and not restrictive. For example, in the description, the first Mach-Zehnder modulator, which receives the NRZ data signal, is depicted as being upstream of the second Mach-Zehnder modulator, which receives the RZ pulse signal. Of course, the operation of the transmitter would be unaffected if the order of the Mach-Zehnder modulators were to be reversed. Also, the continuous-wave laser plus pulse transformer could be replaced by a source that produced optical pulses directly. The scope of the invention is, therefore, indicated by the appended claims rather than by the foregoing description. All changes that come within the meaning and range of equivalency of the claims are to be embraced within their scope.

We claim:

1. An optical return-to-zero transmitter comprising:
    means for providing a pulsed optical signal;
    an optical modulator arranged to receive a non-return-to-zero electrical data signal and a bias signal, to modulate said optical signal with said data signal;
    whereby said optical signal providing means and said modulator provide a return-to-zero optical output signal modulated with said data signal;
    means for controlling the difference in phase between said pulsed optical signal and said data signal in response to a phase control signal;
    means for adding a first dither signal to said difference in phase and a second dither signal, having a different frequency than said first dither signal, to said bias signal;
    means for monitoring the amplitude of variations in the power of the optical output signal corresponding to cross-modulation of said first and second dither signal frequencies; and
    means responsive to said monitored amplitude for adjusting said phase control signal to maintain phase synchronization between said pulsed optical signal and said data signal.

2. The optical return-to-zero transmitter of claim 1, wherein
    said means for providing a pulsed optical signal comprises:
    means for providing a continuous optical signal;
    a second optical modulator arranged to receive a clock signal to modulate said optical signal with pulses.

3. The transmitter of claim 2, wherein said second optical modulator is connected downstream of said optical modulator arranged to receive said non-return-to-zero electrical data signal.

4. The transmitter of claim 2, wherein said optical modulators are Mach-Zehnder modulators.

5. The transmitter of claim 1, wherein the frequency of said second dither signal is substantially lower than the frequency of said first dither signal, and said means for monitoring the amplitude comprises first means for monitoring a first amplitude, being the amplitude of variations in the power of the optical output signal at the frequency of the first dither signal and second means for monitoring the amplitude of variations of said first amplitude at the frequency of the second dither signal.

6. In a return-to-zero optical transmitter in which an optical signal is modulated by a non-return-to-zero electrical data signal applied to an electro-optical modulator and pulsation at the data rate of said data signal is provided by a clock signal, to provide a return-to-zero optical output signal, a method of controlling the difference in phase between said clock signal and said data signal, said method comprising:
    adding a first dither signal to said difference in phase and a second dither signal, having a different frequency than said first dither signal, to a bias signal applied to said electro-optical modulator;
    monitoring the amplitude of variations in the power of the optical output signal corresponding to cross-modulation of said first and second dither signal frequencies; and
    controlling said difference in phase in response to said amplitude.

7. The method of claim 6, wherein said optical modulator is a Mach-Zehnder modulator.

8. The method of claim 6, wherein the frequency of said second dither signal is substantially lower than the frequency of said first dither signal, and monitoring the amplitude comprises monitoring a first amplitude, being the amplitude of variations in the power of the optical output signal at the frequency of the first dither signal and monitoring the amplitude of variations of said first amplitude at the frequency of the second dither signal.

9. An optical transmitter comprising:
   a first optical modulator adapted to provide a NRZ modulated optical signal in response to a data signal and a NRZ bias signal summed with a first dither signal;
   a second optical modulator for modifying said NRZ modulated optical signal in response to a periodic pulse signal adapted according to a feedback signal and a second dither signal to provide a resulting optical signal; and
   a feedback circuit for processing said resultant optical signal to provide said feedback signal, said feedback circuit including a two-dimensional demodulator for detecting a mean optical output power of said resultant optical signal corresponding to a cross modulation of said first and second dither signals.

10. The optical transmitter of claim 9, wherein said optical modulators are Mach-Zehnder modulators.

11. The optical transmitter of claim 9, wherein the frequency of said second dither signal being substantially lower than the frequency of said first dither signal.

* * * * *